US012272876B2

(12) United States Patent
Zimmerman

(10) Patent No.: US 12,272,876 B2
(45) **Date of Patent: *Apr. 8, 2025**

(54) REFLECTOR ANTENNA HEATING SYSTEM

(71) Applicant: Viasat, Inc., Carlsbad, CA (US)

(72) Inventor: Kurt A. Zimmerman, Carlsbad, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,578

(22) Filed: Feb. 7, 2024

(65) Prior Publication Data

US 2024/0388005 A1 Nov. 21, 2024

Related U.S. Application Data

(63) Continuation of application No. 18/027,354, filed as application No. PCT/US2021/050104 on Sep. 13, 2021, now Pat. No. 11,936,110.

(60) Provisional application No. 63/083,839, filed on Sep. 25, 2020.

(51) Int. Cl.
*H01Q 19/19* (2006.01)
*H01Q 1/02* (2006.01)
*H01Q 1/42* (2006.01)

(52) U.S. Cl.
CPC ............. *H01Q 19/193* (2013.01); *H01Q 1/02* (2013.01); *H01Q 1/42* (2013.01)

(58) Field of Classification Search
CPC ........... H01Q 19/193; H01Q 1/02; H01Q 1/42
See application file for complete search history.

(56) References Cited

U.S. PATENT DOCUMENTS

| | | | | | |
|---|---|---|---|---|---|
| 5,920,289 | A * | 7/1999 | Jones | H01Q 15/144 | 239/548 |
| 8,305,278 | B2 * | 11/2012 | Corn | H01Q 1/02 | 343/872 |
| 8,872,710 | B2 * | 10/2014 | Wallace | H01Q 19/12 | 343/912 |
| 2010/0295742 | A1 * | 11/2010 | Corn | H01Q 1/02 | 343/704 |
| 2011/0298675 | A1 * | 12/2011 | Cummings | H01Q 1/02 | 343/704 |
| 2014/0028506 | A1 * | 1/2014 | Wallace | H01Q 1/02 | 29/428 |

* cited by examiner

*Primary Examiner* — David E Lotter
(74) *Attorney, Agent, or Firm* — Snell & Wilmer L.L.P.

(57) ABSTRACT

A reflector antenna heating system includes a dielectric radome that covers a first side of a reflector and a feed subsystem of an antenna. The system also includes a plurality of heater blower devices on a second side of the reflector, each of the plurality of heater blower devices having an inlet port and an outlet port. The system further includes a plurality of outlet duct assemblies, wherein each of the plurality of outlet duct assemblies is coupled to the outlet port of a respective heater blower device to direct heated air around a perimeter of the reflector and along an inside surface of the dielectric radome. One or more gaps proximal to a center of the reflector are included to recirculate cooled air toward a plurality of inlet ducts for the plurality of heater blower devices to feed the inlet port of each heater blower device.

18 Claims, 10 Drawing Sheets

REFLECTOR ANTENNA HEATING SYSTEM

RELATED APPLICATIONS

The present application is a continuation application of U.S. application Ser. No. 18/027,354 filed Mar. 20, 2023, entitled "Reflector Antenna Heating System". The Ser. No. 18/027,354 application is a U.S. National Stage under 35 USC 371 patent application, claiming priority to Serial No. PCT/US2021/050104 filed on Sep. 13, 2021, entitled "Reflector Antenna Heating System" which claims the benefit of priority to U.S. Provisional Application No. 63/083,839 filed on Sep. 25, 2020, entitled, "Satellite Antenna Anti-Icing System", the entirety of which are incorporated herein by reference.

TECHNICAL FIELD

This disclosure relates generally to antennas. More particularly, this disclosure describes a reflector antenna heating system for an antenna.

BACKGROUND

A satellite antenna (e.g., a directional antenna) can be implemented as a satellite dish for a ground station. In some such examples, the satellite antenna includes a parabolic reflector and a feedhorn. Moreover, the support structure for the satellite antenna can include an antenna pointer on which the satellite antenna is mounted. Further, the antenna pointer can include a moveable joint or multiple pivot points to allow the satellite antenna to change the pointing of the satellite antenna.

Rain fade refers primarily to the absorption of a microwave radio frequency (RF) signals by atmospheric rain, snow and/or ice, and losses which are especially prevalent at frequencies above about 11 Gigahertz (GHz). Rain fade can be caused by precipitation at an uplink or downlink location. About 5% to about 20% of rain fade or satellite signal attenuation may also be caused by snow and/or ice that has accumulated on an uplink or downlink antenna reflector, radome or feedhorn.

SUMMARY

In one example, a reflector antenna heating system includes a dielectric radome that covers a first side of a reflector and a feed subsystem of an antenna. The reflector antenna heating system also includes a plurality of heater blower devices on a second side of the reflector. Each of the plurality of heater blower devices has an inlet port and an outlet port. The reflector antenna heating system further includes a plurality of outlet duct assemblies. Each of the plurality of outlet duct assemblies is coupled to the outlet port of a respective heater blower device to direct heated air around a perimeter of the reflector and along an inside surface of the dielectric radome. One or more gaps proximal to a center of the reflector are included to recirculate cooled air toward a plurality of inlet ducts for the plurality of heater blower devices to feed the inlet port of each heater blower device of the plurality of heater blower devices.

DETAILED DESCRIPTION

The present disclosure relates to a reflector antenna heating system for a antenna with a reflector. In some examples, the antenna is a parabolic antenna (e.g., a satellite dish). The antenna communicates with a target satellite. The antenna heating system includes a dielectric radome that covers a first side of a reflector (e.g., a reflecting side of the reflector) and a feed subsystem of an antenna. The dielectric radome is a face radome form of a flexible material, such as fabric. The feed subsystem includes a feedhorn and a feed can. In some examples, the feed subsystem also includes a subreflector.

The reflector antenna heating system also includes a plurality of heater blower devices on a second side of the reflector that each have an inlet port and an outlet port. The heater blower devices are formed with a fan (e.g., an axial fan) coupled with a heating element. Each of a plurality of outlet duct assemblies of the reflector antenna heating system is coupled to the outlet port of a respective heater blower device to direct heated air around a perimeter of the reflector and along an inside surface of the dielectric radome. Furthermore, the antenna includes a gap (or multiple gaps) proximal to a center of the reflector to recirculate cooled air toward a plurality of inlet ducts for the plurality of heater blower devices to feed the inlet port of each heater blower device.

In operation, the reflector antenna heating system can melt snow and/or ice buildup (and/or prevent such buildup) on the dielectric radome. This snow and/or ice (if left un-melted) would lead to gain loss of the antenna. More particularly, the heated air circulated proximal to the dielectric radome by the plurality of outlet duct assemblies raises an exterior temperature of the dielectric radome to above 0 degrees Celsius, thereby melting the snow and/or ice, and allowing melted snow and/or ice to run off the dielectric radome. Additionally, the heated air is circulated such that most (e.g., about 70% or more) of the heat in the heated air is dissipated through the dielectric radome, and the remaining heat (30% or less) is absorbed by the reflector. Accordingly, thermal expansion due to heating of the reflector is curtailed while the dielectric radome is heated to melt the snow and/or ice. Avoiding such thermal expansion reduces a gain loss that would otherwise be experienced by the antenna.

Figure 1:
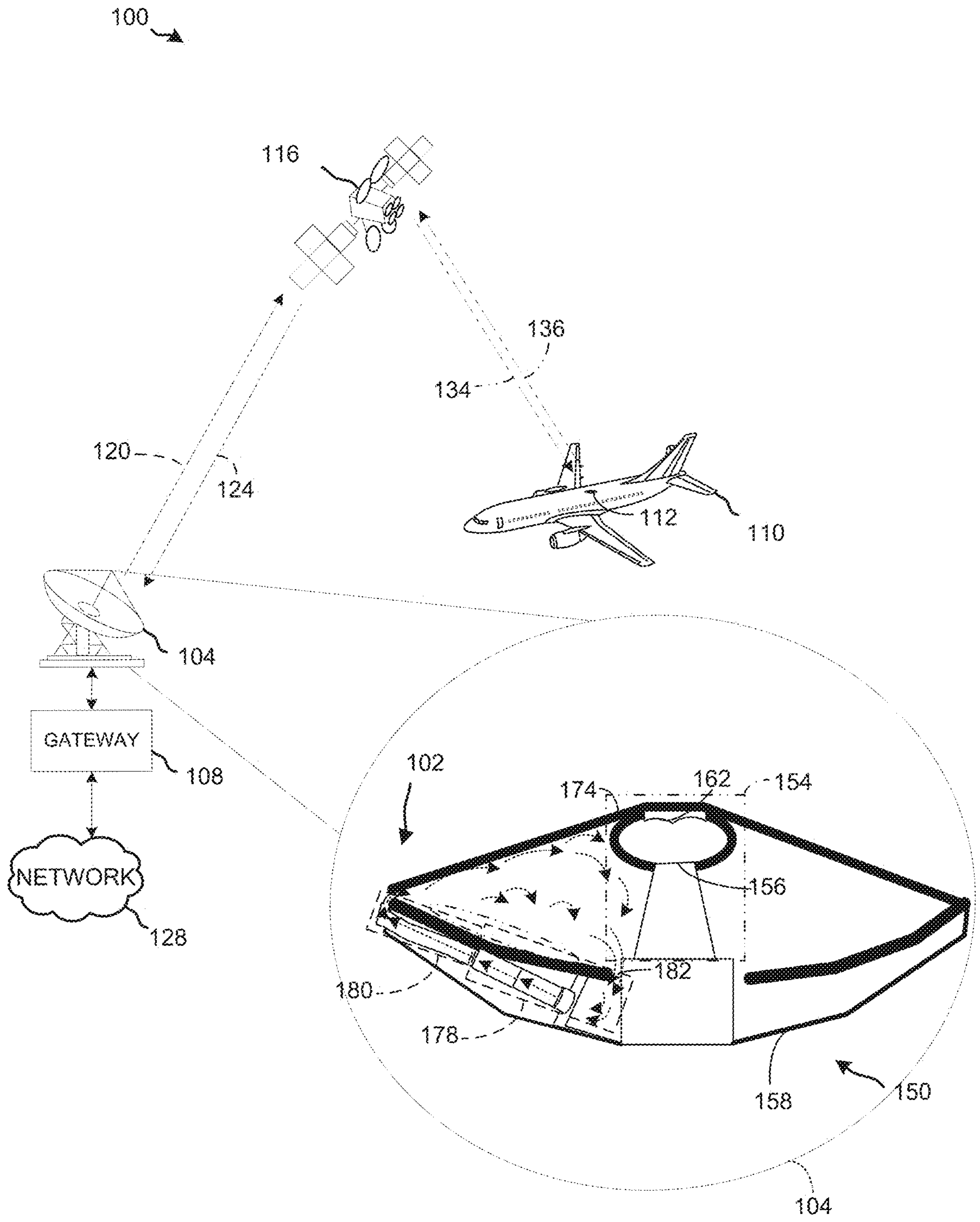
FIG. 1 illustrates an example satellite communications system that includes an antenna heater system for an antenna.

FIG. 1 illustrates an example satellite communications system 100 that includes a reflector antenna heating system 102 to prevent snow and ice from forming on a terrestrial antenna system 104 of a gateway terminal 108. The satellite communications system 100 includes a vehicle 110 (e.g., an aircraft) that has an antenna system 112 that supports wireless communications with a satellite (e.g., a target satellite 116). In some examples, the target satellite 116 provides bidirectional communication between the vehicle 110 and the gateway terminal 108. The gateway terminal 108 can be referred to as a hub or ground station. The antenna system 104 of the gateway terminal 108 supports transmitting forward uplink signals 120 to the target satellite 116 and receiving return downlink signals 124 from the target satellite 116. The gateway terminal 108 can also schedule traffic communicated via the antenna system 112. Alternatively, the scheduling can be performed in other parts of the satellite communications system 100 (e.g., a core node, or other components, not shown).

The gateway terminal 108 can be provided as an interface between a network 128 and the target satellite 116. The gateway terminal 108 can be configured to receive data and information directed to the antenna system 104 from a source accessible via the network 128. The gateway terminal 108 can format the data and information and transmit forward uplink signals 120 to the target satellite 116 for delivery to the antenna system 112. Similarly, the gateway terminal 108 can be configured to receive forward downlink signals 124 from the target satellite 116 (e.g., containing data and information originating from the antenna system 112) that is directed to a destination accessible via the network 128. The gateway terminal 108 can also format the received return downlink signals 134 for transmission on the network 128.

The network 128 can be any type of network and can include for example, the Internet, an IP network, an intranet, a wide area network (WAN), a virtual LAN (VLAN), a fiber optic network, a cable network, a public switched telephone network (PSTN), a public switched data network (PSDN), a public land mobile network, and/or any other type of network supporting communication between devices as described herein. The network 128 can include both wired and wireless communication links as well as optical links. The network 128 can connect multiple gateway terminals 108 that can be in communication with the target satellite 116 and/or with other satellites.

The target satellite 116 can receive the forward uplink signals 120 from the gateway terminal 108 and transmit corresponding forward downlink signals 134 to the antenna system 112. The target satellite 116 can also receive return uplink signals 136 from the antenna system 112 and transmit corresponding return downlink signals 124 to the gateway terminal 108. The forward uplink signals 136 and/or return downlink signals 124 that are communicated between the gateway terminal 108 and the target satellite 116 can use the same, overlapping, or different frequencies as the return uplink signals 136 and/or the forward downlink signals 134 communicated between the target satellite 116 and the antenna system 112. The target satellite 116 can operate in a multiple spot beam mode, transmitting and receiving a number of narrow beams directed to different regions on Earth. Alternatively, the target satellite 116 can operate in wide area coverage beam mode, transmitting one or more wide area coverage beams. In some examples, the target satellite 116 can be a geostationary satellite or a non-geostationary satellite, such as a low earth orbit (LEO) or medium earth orbit (MEO) satellite. Although only a single target satellite 116 is shown in the satellite communications system 100, other communications systems can have more than one target satellite 116, and such target satellites 116 can support various operations of unidirectional or bidirectional communications.

The target satellite 116 can be configured as a "bent pipe" satellite that performs frequency and polarization conversion of the received signals before retransmission of the signals to their destination. As another example, the target satellite 116 can be configured as a regenerative satellite that demodulates and re-modulates the received signals before retransmission.

The antenna system 112 is mounted on a platform of the vehicle 110, which is an aircraft in the illustrated example. More generally, the antenna system 112 can be mounted on various types of vehicles 110 such as aircraft (e.g., airplanes, helicopters, drones, blimps, balloons, etc.), trains, automobiles (e.g., cars, trucks, busses, etc.), watercraft (e.g., private boats, commercial shipping vessels, cruise ships, etc.) and others. In some examples, the antenna system 112 is used for bidirectional (two-way) communication with the target satellite 116. In other examples, the antenna system 112 can be used for unidirectional communication with the target satellite 116, such as a receive-only implementation (e.g., receiving satellite broadcast television).

The terrestrial antenna system 104 includes an antenna 150 for communicating the uplink signal 120 and the downlink signal 124 that supports communication between the gateway terminal 108 and the target satellite 116. In the example illustrated, the antenna 150 is implemented as a satellite dish with a feed subsystem 154 and a parabolic reflector 158. The feed subsystem 154 includes an antenna feedhorn 156. In the example illustrated, the feed subsystem 154 also includes a subreflector 162. In other examples, the subreflector is omitted.

The reflector antenna heating system 102 is mounted on the antenna 150. The reflector antenna heating system 102 includes a radome 174, a heater blower device 178 and an outlet duct assembly 180. The radome 174 is a face radome formed of dielectric material, such as a fabric. In some examples, the radome 174 is referred to as a dielectric radome. The fabric for forming the radome 174 can be a flexible, waterproof material. The radome 174 extends over the parabolic reflector 158, the subreflector 162 and the antenna feedhorn 156 to form a frustum conical shape (e.g., a truncated cone) or a conical shape.

The heater blower device 178 and the outlet duct assembly 180 are situated (e.g., through mounting) on an exterior of the parabolic reflector 158. In some examples, the heater blower device 178 and the outlet duct assembly 180 are mounted between radial ribs of the parabolic reflector 158. The heater blower device 178 includes a fan (e.g., an axial fan) and a heating element. The heater blower device 178 includes an inlet port and an outlet port. The outlet port of the heater blower device 178 is coupled to the outlet duct assembly 180. The heater blower device 178 and the outlet duct assembly 180 operate in concert to heat and inject heated air into a region underlying the radome 174. In the example illustrated, the antenna system 104 includes one heater blower device 178 and one outlet duct assembly 180, but in other examples, more heater blower devices and/or more outlet duct assemblies can be mounted on the exterior of the parabolic reflector 158.

The outlet duct assembly 180 is mounted such that an outlet port is proximal to a perimeter of the parabolic reflector 158. Moreover, the outlet duct assembly 180 is configured to circulate heated air into a region underlying the radome 174 such that heated air is circulated tangentially to the underside of the radome 174. Accordingly, air proximal to the dielectric radome has a first velocity and circulated heated air proximal to the first side of the reflector has a second velocity, lower than the first velocity. Stated differently, the outlet duct assembly 180 is situated to direct heated air in a direction that causes more heated air to flow proximal to the radome 174 than the parabolic reflector 158. Accordingly, heat is dissipated through the radome 174 into open air before circulating back to the heater blower device 178 through a gap 182 in the parabolic reflector 158 that is proximal to a center of the antenna 150 and a planum for the heater blower device 178. The inlet port of the heater blower device 178 is coupled to an inlet duct situated within the planum to enable re-heating and re-circulation of the air being returned through the gap 182.

The reflector antenna heating system 102 is configured to sufficiently heat the radome 174 and the antenna 150 to prevent ice, snow and/or frost from accumulating on an exterior of the radome 174. However, the heater blower device 178 and the outlet duct assembly 180 are also configured to avoid overheating the parabolic reflector 158, so as to avoid unwanted thermal expansion of the parabolic reflector 158 that can interfere with the operation of the antenna 150. In particular, thermal expansion of the parabolic reflector 158 can reduce a gain of the antenna 150. Accordingly, by curtailing the thermal expansion of the antenna 150, gain loss due to such thermal expansion is also reduced.

In some examples, the reflector antenna heating system 102 can continue to circulate heated air during ongoing communications of the antenna 150. In other words, the methods and apparatus described herein can also support providing ongoing heating of air and circulating the heated air in the region underlying (and proximal to) the radome 174 while the uplink signal 120 and/or the return downlink signal 124 is communicated with the target satellite 116.

Figure 2:
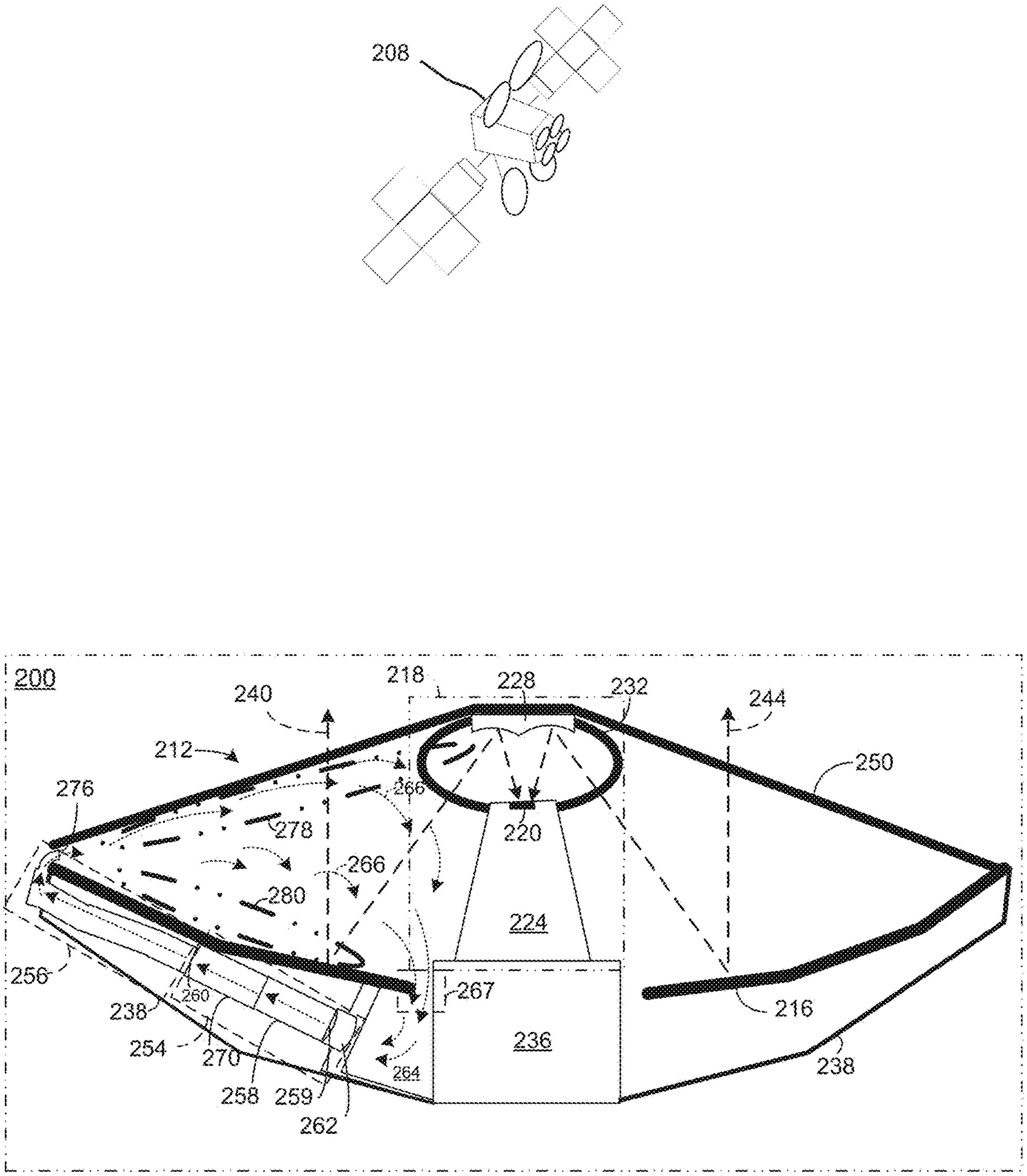
FIG. 2 illustrates a diagram illustrating an example of an antenna with an antenna heating system mounted thereon.

FIG. 2 is a diagram illustrating an example of an antenna 200 mounted at a gateway (e.g., a ground station) for communications with a target satellite 208, wherein a reflector antenna heating system 212 is mounted on the antenna 200. The antenna 200 can be employed as an element of an antenna system, such as the antenna system 104 of FIG. 1. More specifically, The antenna 200 can be employed to implement the antenna 150 of FIG. 1, and the reflector antenna heating system 212 can be employed to implement the reflector antenna heating system 102 of FIG. 1. Similarly, the target satellite 208 can be employed to implement the target satellite 116 of FIG. 1.

The antenna 200 is implemented as a dish antenna with a parabolic reflector 216. In some examples, the parabolic reflector 216 is implemented with a paraboloid shape with a circular cross section. In other examples, the parabolic reflector 216 is implemented as a paraboloid shape with an oval cross section. The antenna 200 includes a feed subsystem 218. The feed subsystem 218 includes a feedhorn 220 mounted on a feed can 224. The feed can 224 is mounted on a reflector hub 236 proximal to a center of the antenna 200. The feed subsystem 218 also includes a subreflector 228 spaced apart from the feedhorn 220 with a spar 232 (or other support structure) of the feed subsystem 218. Moreover, in other examples, there is more than one spar 232. The feed can 224 is mounted on a reflector hub 236, which reflector hub 236 can be mounted on an antenna pointing system that controls a pointing direction of the antenna 200.

Radial ribs 238 are arranged on an outer side (a non-reflecting side) of the parabolic reflector 216. The radial ribs 238 are arranged to provide structural support for the parabolic reflector 216.

Communication signals are propagated in directions indicated by a first arrow 240 and a second arrow 244. As indicated by the first arrow 240 and the second arrow 244, uplink (outgoing) signals that are transmitted from the feedhorn 220 are reflected by the subreflector 228 and reflected by an inner side (e.g., a reflecting side) of the parabolic reflector 216 toward the target satellite 208. Additionally, downlink (incoming) signals are transmitted from the target satellite 208, reflected by the inner side of the parabolic reflector 216, reflected again by the subreflector 228 and received by the feedhorn 220. Additionally, although the antenna 200 is shown to provide two-way communication signals with the target satellite 208, in other examples, the antenna 200 provides one-way communication with the target satellite 208.

The signals communicated by the antenna 200 range from about 3.7 GHz to about 14 GHz or higher. Moreover, the greater the frequency, the more susceptible the antenna 200 is to interference caused by environmental conditions, such as snow and/or ice accumulating on portions of the antenna 200. Additionally, as the proliferation of low-orbit satellites (LEOs) increases, the number of satellite dish antennas, such as the antenna 200 installed in facilities in regions of the Earth with cold climates increases. Furthermore, even without accumulation of ice, snow and/or frost on the antenna 200, changing temperatures cause thermal expansion on elements of the antenna 200, such as the parabolic reflector 216, the subreflector 228 and/or the feed can 224.

To curtail the impact of the environmental conditions, the reflector antenna heating system 212 is installed on the antenna 200. The reflector antenna heating system 212 includes a radome 250 formed of a dielectric (e.g., fabric) stretched over the parabolic reflector 216 and the subreflector 228. More specifically, in some examples, the radome 250 could be formed with a polytetrafluoroethylene glass fabric. Polytetrafluoroethylene glass fabric provides hydrophobic rain shedding and passive low ice adhesions. The radome 250 has a frustum conical (truncated conical) shape or a conical shape, which can reduce frontal drag and/or protect the antenna 200 from hail damage, and sheds wind blow debris, such as leaves, sticks, etc. The radome 250 is a face radome for the antenna 200. In some examples, the radome 250 is stretched taut to avoid wrinkles on an exposed surface of the radome 250.

The reflector antenna heating system 212 also includes a heater blower device 254 coupled to an outlet duct assembly 256. In the example illustrated, there is one heater blower device 254 and one outlet duct assembly 256, but in other examples, there is a set of heater blower devices 254 and a set of outlet duct assemblies arranged circumferentially about the parabolic reflector 216. The heater blower device 254 and the outlet duct assembly 256 are mounted on the outer side (e.g., the non-reflecting side) of the parabolic reflector 216. In some examples, the heater blower device 254 and/or the outlet duct assembly 256 are mounted in a region between two radial ribs 238 on the outer side of the parabolic reflector 216. The heater blower device 254 includes a fan 258 (e.g., an axial fan) that forces air from an inlet port 259 of the heater blower device 254 coupled to an inlet duct 262 in a planum 264. The heater blower device 254 drives the air into the outlet duct assembly 256 that is coupled to an outlet port 260 of the heater blower device 254. The planum 264 underlies a gap 267 between the reflector hub 236 and the parabolic reflector 216. The gap 267 is positioned proximal to a center region of the antenna 200 to be spaced apart from a region of the parabolic reflector 216 that reflects the communication signal propagating in the directions indicated by the first arrow 240 and/or the second arrow 244. The gap 267 enables air to be pulled from the center region of the parabolic reflector 216 at a base of the feed can 224 to reduce airflow across a base of the parabolic reflector 216. An inlet duct 262 is situated in the planum 264 and is coupled to the inlet port 259 of the heater blower device 254. The inlet duct 262 provides a passage for air to flow out of the planum 264 and into the heater blower device 254.

Airflow in the antenna 200 is characterized with arrows 266, only some of which are labeled. The fan 258 forces (blows) air from the planum 264 into a heating element 270 that is coupled to an outlet port of the fan 258. The heating element 270 heats air received from the fan 258 and heated air flows to the outlet duct assembly 256 coupled to the outlet port 260 of the heater blower device 254. The outlet duct assembly 256 directs the flow of the heated air to a region underlying the radome 250. The outlet duct assembly 256 is arranged such that an outlet port 276 is pointed in a direction extending parallel to a leg of the radome 250, such that heated air flows tangentially to an inside cover to the radome 250. The heated air flows across an underside of the radome 250 and toward the subreflector 228 and/or the feedhorn 220 of the antenna 200. More particularly, the outlet duct assembly 256 is configured to direct heated air such that heated air flows over a first region 278 proximal to the underside of the radome 250 at a greater velocity than heated air flowing over a second region 280 proximal to a surface of the inner side of the parabolic reflector 216. Stated differently, heated air flowing near the radome 250 has a first velocity, and heated air flowing over the inner side of the parabolic reflector 216 has a second velocity, and the first velocity is greater than the second velocity. Moreover, as the heated air cools, the cooled air is drawn into the planum 264 by the fan 258 for re-heating and recirculation.

By implementing the reflector antenna heating system 212 on the antenna 200, as an environmental temperature is lowered, ice, snow and/or frost is impeded from accumulating on an exterior surface of the radome 250 because heated air is flowing proximally to the underside of the radome 250, such as in the first region 278. Contemporaneously, a relatively small amount of heated air flows over the inner surface of the parabolic reflector 216. Accordingly, the parabolic reflector 216 has a temperature that is closer to the environmental temperature than the radome 250. Thus, misalignment due to thermal expansion of the parabolic reflector 216 is curtailed. Moreover, because the subreflector 228 and the feedhorn 220 (which are heated by the heated air) are smaller than the parabolic reflector 216, the thermal expansion of the subreflector 228 and/or the feedhorn 220 are also relatively small.

Additionally, the reflector antenna heating system 212 heats the feed subsystem 218 with convection. Accordingly, the reflector antenna heating system 212 obviates the need for a dedicated heater and/or wire running through a center region of the antenna 200 to heat the feed subsystem 218.

Further still, as illustrated, signals communicated between the target satellite 208 and the feedhorn 220 only traverse the radome 250 once. Accordingly, attenuation of the signals communicated between the target satellite 208 and the feedhorn 220 is curtailed.

Figure 3:
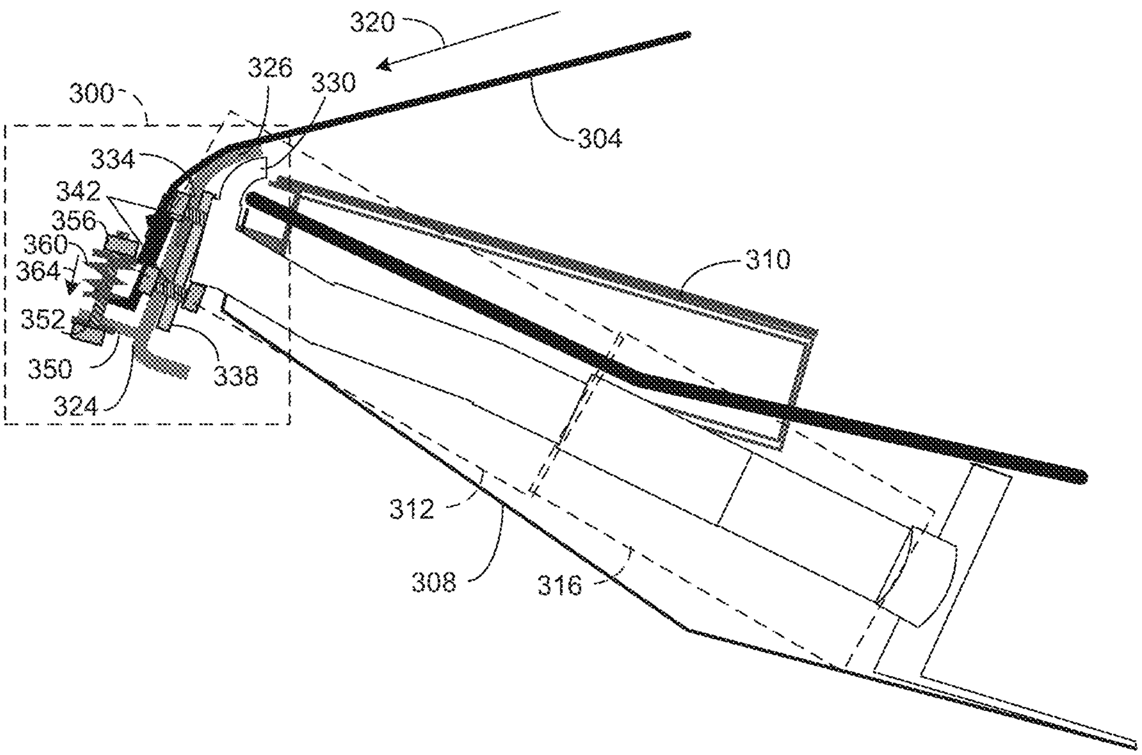
FIG. 3 illustrates a tension assembly that applies tension on a radome.

FIG. 3 illustrates a tension assembly 300 that applies tension on a radome 304, such as the radome 250 of FIG. 2 and/or the radome 174 of FIG. 1. Multiple instances of the tension assembly 300 are situated near a perimeter of a parabolic reflector 308. Additionally, the tension assembly 300 can be proximal to an outlet duct assembly 312 coupled to a heater blower device 316, such as the outlet duct assembly 256 of FIG. 2. The parabolic reflector 308 includes a perimeter frame 310 that is mounted proximal to a perimeter of the parabolic reflector 308.

The tension assembly 300 provides a tension on the radome 304 in a direction indicated by an arrow 320. In situations where multiple tension assemblies 300 are arranged circumferentially on a perimeter of the parabolic reflector 308, opposing tension forces keep the radome 304 taut.

To provide the tension, the tension assembly 300 includes a perimeter bracket 324 that includes a rounded top edge 326 to prevent tearing of the radome 304 (which is formed of fabric). In some examples, the rounded top edge 326 overhangs an outlet port 330 of the outlet duct assembly 312 to prevent the outlet port 330 from tearing the radome 304. The perimeter bracket 324 also includes a planer region 334 that extends perpendicular to a plate 338 that circumscribes the perimeter of the parabolic reflector 308. The planer region 334 and the plate 338 include through holes 342 that receive fasteners (e.g., bolts) to secure the perimeter bracket 324 to the plate 338.

The perimeter bracket 324 also includes a tab 350 that extends normal (e.g., perpendicular) to the planer region 334. The tab 350 includes a through hole 352. A spring loaded tension bolt 356 extends through the through hole 352 and through a hole at a perimeter of the radome 304. A spring 360 in the spring loaded tension bolt 356 applies an expansive force in a direction indicated by the arrow 364 to generate the tension on the radome 304 indicated by the arrow 320.

In situations where a weight (e.g., due to environmental precipitation, such as snow) is applied on the radome 304, such a weight pulls the spring 360 in a direction opposite of the arrow 364, which reduces the impact of the tension in the direction of the arrow 320, and allows a portion of the radome 304 to flex in a direction toward the parabolic reflector 308. Additionally, in these situations, activation of the duct assembly 312 directs heated air tangentially to an inside surface of the radome 304, thereby melting snow and/or ice that is applying the weight. After melting, water rolls off the radome 304 in a direction indicated by the arrow 320, such that the weight is removed from the radome 304. Removal of the weight allows the spring 360 to re-expand in the direction indicated by the arrow 364 thereby pulling the radome 304 taut again. Accordingly, employment of the tension assembly 300 enables the radome 304 to be pulled taut across the perimeter of the parabolic reflector 308 while concurrently allowing flex of the radome 304 to prevent tearing from excessive force.

Additionally using the tension assembly 300 enables the radome 304 to be installed after assembly of the antenna in the field. Moreover, the tension assembly 300 enables removal of the radome 304, such that the radome 304 can be cleaned or replaced periodically and/or asynchronously (e.g., if the radome 304 is torn).

Figure 4:
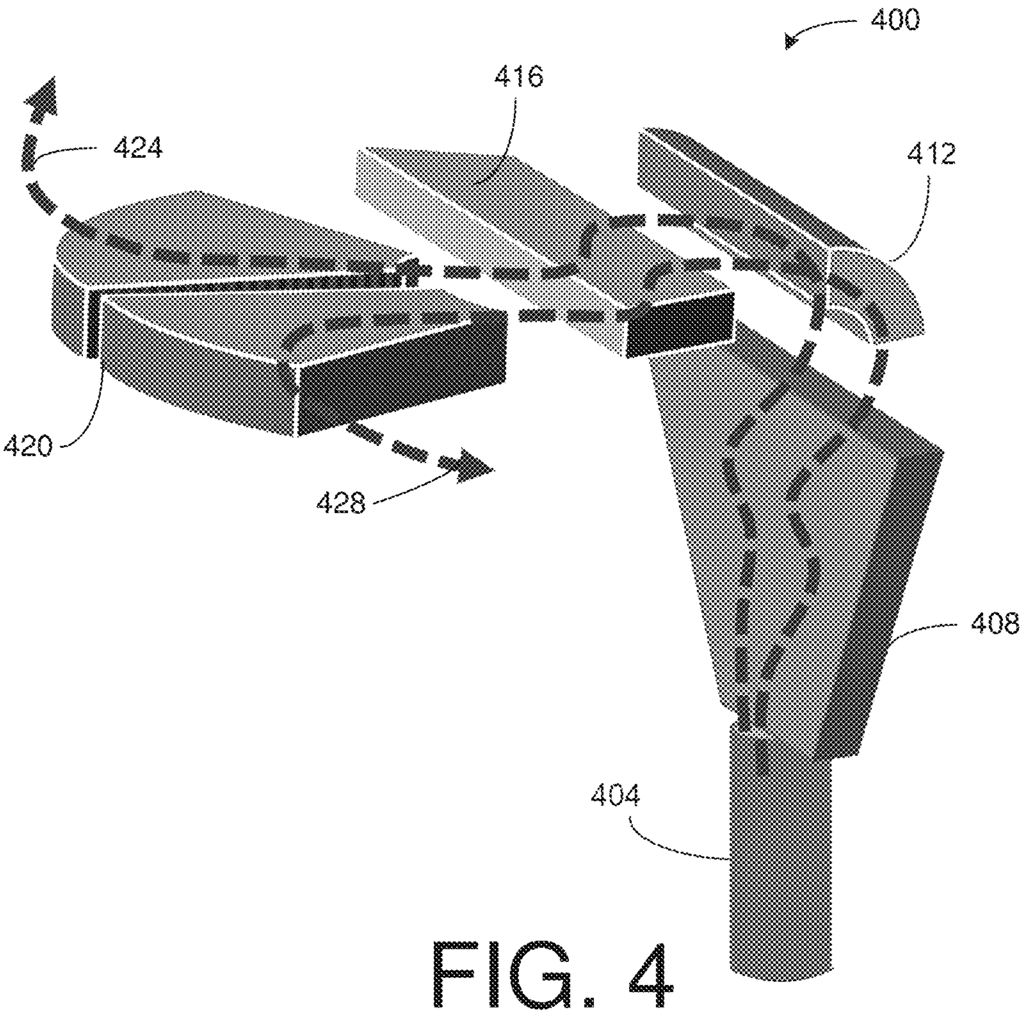
FIG. 4 illustrates an outlet duct assembly that is configured to be coupled to a heater blower device.

FIG. 4 illustrates an outlet duct assembly 400 that is configured to be coupled to a heater blower device, such as the heater blower device 254 of FIG. 2. The outlet duct assembly 400 is employable as the outlet duct assembly 312 of FIG. 3, and/or the outlet duct assembly 256 of FIG. 2. The outlet duct assembly 400 includes a hose feed 404 that is coupled to a heating element, such as the heating element

270 of FIG. 2. Heated air flows into the hose feed 404 and to a circular to rectangular transition element 408. The circular to rectangular transition element 408 is also implemented as a spreader, and the circular to rectangular transition element 408 is coupled to an elbow element 412. The elbow element 412 is shaped to provide about a 90 degree bend in airflow of heated air flowing from the rectangular transition element 408. The elbow element 412 is coupled to a plane spreader 416. The plane spreader 416 spreads heated air flowing from the elbow element 412 about a plane, such as a horizontal plane. The plane spreader 416 is coupled to a nozzle 420 that is shaped as a splitter back spray element to spray heated air in two opposing directions within a plane. Stated differently, the nozzle 420 is shaped as an air knife to direct heated air along an inside edge of a radome.

For illustrative purposes, a first arrow 424 and a second arrow 428 are included to provide an example of airflow through the outlet duct assembly 400. More particularly, as illustrated, the heated air flows from the hose feed 404, and to the rectangular transition element 408. Additionally, as illustrated by the first arrow 424 and the second arrow 428 the heated air flows through the elbow element 412 and bends in about 90 degrees and flows into a plane spreader 416. The plane spreader 416 spreads the heated air about a plane and direct the heated air toward the nozzle 420. As illustrated by the divergent directions of the first arrow 424 and the second arrow 428, as the heated air exits the nozzle 420, the heated air is output in opposing directions of the plane.

Figure 5:
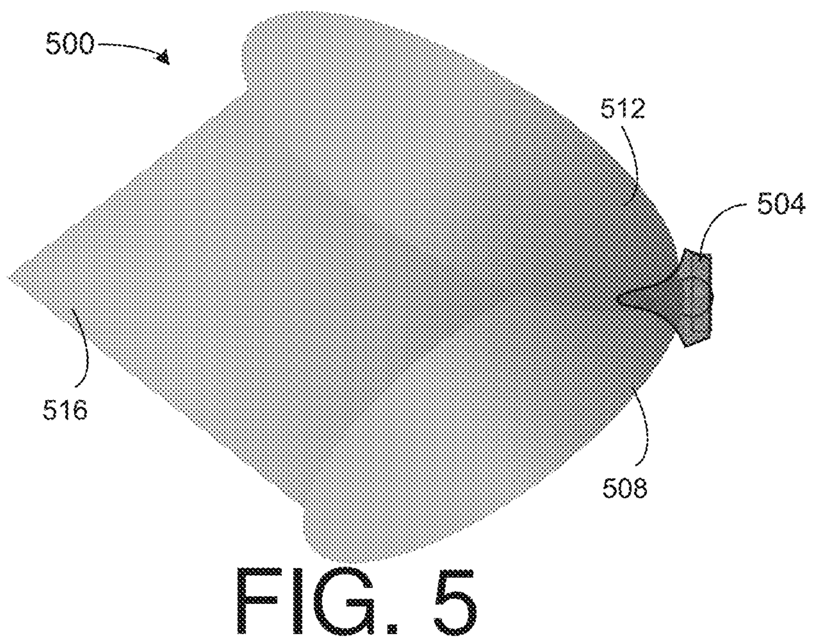
FIG. 5 illustrates a heat map of heated air exiting a nozzle.

FIG. 5 illustrates a heat map 500 of heated air exiting a nozzle 504, such as the nozzle 420 of FIG. 4. The heat map 500 represents heat resulting from heated air exiting the nozzle 504 within a boundary defined by a radome (e.g., the radome 250 of FIG. 2) and a parabolic reflector (e.g., the parabolic reflector 216 of FIG. 2). The heat map 500 includes a first lobe 508 and a second lobe 512 that represents heated air directly exiting the nozzle 504. The heat map 500 also includes a secondary region 516 that represents heat resulting from a diffusion of heated air in the first lobe 508 and the second lobe 512.

Figure 6:
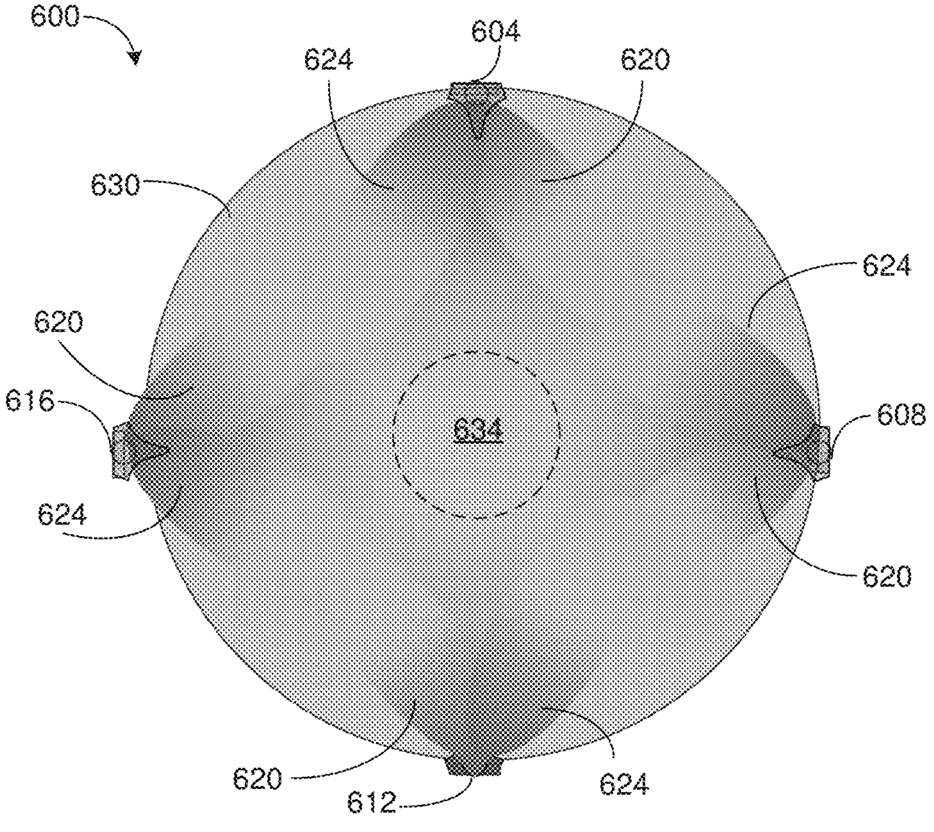
FIG. 6 illustrates another heat map of heated air exiting four (4) nozzles concurrently.

FIG. 6 illustrates another heat map 600 of heated air exiting a first nozzle 604, a second nozzle 608, a third nozzle 612 and a fourth nozzle 616 concurrently. As noted, in some examples, multiple instances of outlet duct assemblies are mounted thereon. Thus, the heat map 600 represents an example of a heat map under a radome (e.g., the radome 250 of FIG. 2) and over a parabolic reflector (e.g., the parabolic reflector 216 of FIG. 2), where four (4) outlet duct assemblies have been mounted circumferentially about a perimeter of the parabolic reflector.

Each of the first nozzle 604, the second nozzle 608, the third nozzle 612 and the fourth nozzle 616 implement instances of the nozzle 504 of FIG. 5. Thus, the first nozzle 604, the second nozzle 608, the third nozzle 612 and the fourth nozzle 616 spray heated air represented with instances of a first lobe 620 and a second lobe 624. Moreover, a secondary region 630 represents heat resulting from a diffusion of heated air from each instance of the first lobe 620 and the second lobe 624. As illustrated, the first nozzle 604, the second nozzle 608, the third nozzle 612 and the fourth nozzle 616 direct air in opposing directions to distribute heat evenly.

As illustrated by the heat map 600, a center region 634 has a lowest heat. Accordingly, features of an antenna, such as a subreflector (e.g., the subreflector 228 of FIG. 2) and/or a feedhorn (e.g., the feedhorn 220 of FIG. 2) have the least heat applied. Thus, the features of the antenna at or near the center region 634 have thermal expansion curtailed, because these features have the least heat applied thereon.

Figure 7:
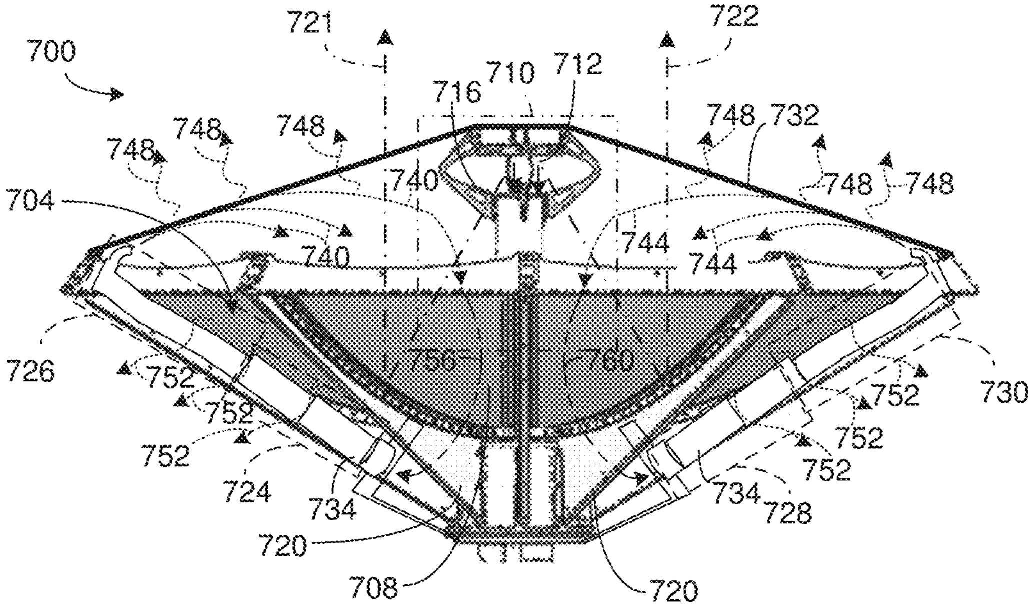
FIG. 7 illustrates another diagram of an antenna with a reflector antenna heating system mounted thereon.

FIG. 7 illustrates a diagram of an antenna 700 mounted at a gateway (e.g., a ground station) for communications with a target satellite, wherein a reflector antenna heating system 704 is mounted on the antenna 700. The antenna 700 can be employed as an element of an antenna system, such as the antenna system 104 of FIG. 1. More specifically, the antenna 700 can be employed to implement the antenna 150 of FIG. 1, and the reflector antenna heating system 704 can be employed to implement the reflector antenna heating system 102 of FIG. 1.

The antenna 700 includes a parabolic reflector 708 and a feed subsystem 710. The feed subsystem 710 includes a subreflector 712 and a feedhorn 716. The antenna 700 also includes radial ribs 720 that are circumferentially arranged around an outer side (non-reflecting side) of the parabolic reflector 708. The radial ribs 720 provide structural support for the parabolic reflector 708. To communicate signals with the target satellite, signals are propagated in directions indicated by a first arrow 721 and a second arrow 722.

The reflector antenna heating system 704 includes two heater blower devices and two outlet duct assemblies, namely a first heater blower device 724, a first outlet duct assembly 726, a second heater blower device 728 and a second outlet duct assembly 730. Inclusion of two (2) or more heater blower devices eliminates a single point of failure. The first outlet duct assembly 726 is coupled to the first heater blower device 724, and the second outlet duct assembly 730 is coupled to the second heater blower device 728. In other examples, there can be more heater blower devices. The first heater blower device 724, the first outlet duct assembly 726, the second heater blower device 728 and the second outlet duct assembly 730 are mounted between radial ribs 720. Two radial ribs 720 and a perimeter of the parabolic reflector 708 cooperate to define a volume. The first heater blower device 724 and the first outlet duct assembly 726 are positioned within a first instance of that volume. Similarly, the second heater blower device 728 and the second outlet duct assembly 730 are positioned within a second instance of the volume.

The reflector antenna heating system 704 also includes a radome 732 that extends over the parabolic reflector 708 and the feed subsystem 710 (including the subreflector 712 and the feedhorn 716). The radome 732 is a face radome formed of a dielectric (e.g., fabric). In the example illustrated, the parabolic reflector 708 has a frustum conical shape. In the example illustrated, the first heater blower device 724 and the second heater blower device 728 each include a fan 734 (e.g., an axial fan).

The diagram of FIG. 7 illustrates airflow and heat dissipation of the antenna 700 during operation of the first heater blower device 724 and the second heater blower device 728. Thus, the first heater blower device 724 drives heated air to the first outlet duct assembly 726 to circulate heated air tangentially to an inside surface of the radome 732, as indicated by arrows 740. Similarly, the second heater blower device 728 drives heated air to the second outlet duct assembly 730 to circulate heated air tangentially to an inside surface of the radome 732, as indicated by arrows 744. As the heated air flows from the first outlet duct assembly 726 and the second outlet duct assembly 730 proximal to the radome 732, heat is radiated through the radome 732 into free space, as indicated by arrows 748. Additionally, some (but less) heat is dissipated through the parabolic reflector 708, as indicated by arrows 752. As one example, about 70% to about 80% of the heat dissipated from the heated air is dissipated through the radome 732, and about 20% to about 30% of the heat dissipated from the heated air is dissipated through the parabolic reflector 708. As the heated air dissipates heat, cooled air returns to a plenum for the first heater blower device 724 and the second heater blower device 728, as indicated by arrows 756 and 760.

By operating the reflector antenna heating system 704, ice, snow and/or frost buildup on the radome 732 that would otherwise lead to gain loss of the antenna 700 is curtailed. More particularly, the heated air circulated proximal to the radome 732 by the first outlet duct assembly 726 and the second outlet duct assembly 730 raises an exterior temperature of the radome 732 to above 0 degrees Celsius, thereby melting the ice, snow and/or frost, and allowing melted ice, snow and/or frost to run off the radome 732. Moreover, ice, snow and/or frost buildup on the outer side (the non-reflecting side) of the parabolic reflector 708 does not impact a gain and/or a squint of the antenna 700.

Figure 8:
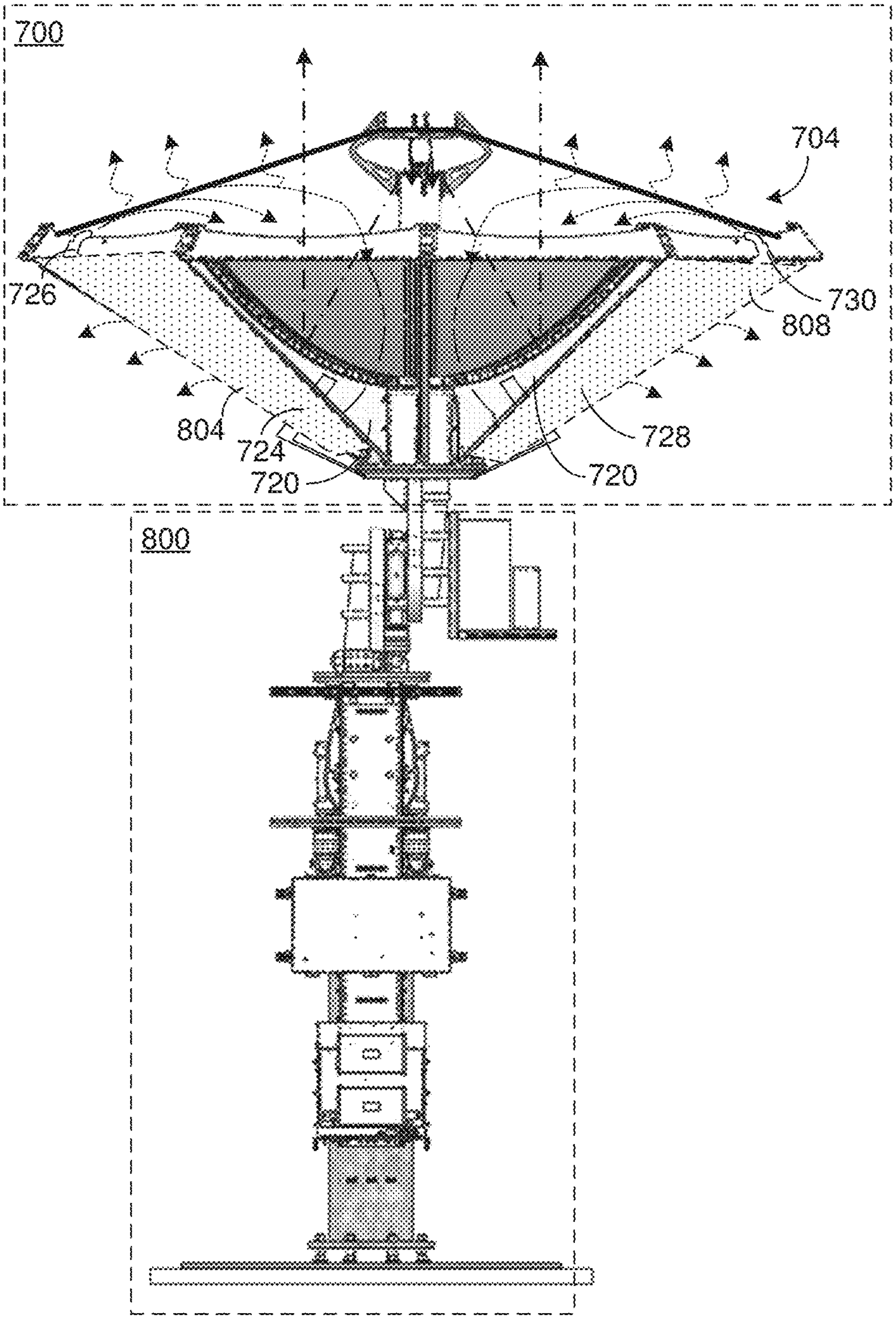
FIG. 8 illustrates an example of an antenna mounted on an antenna pointer.

FIG. 8 illustrates an example of the antenna 700 mounted on an antenna pointer 800. For purposes of simplification of explanation, FIGS. 7 and 8 employ the same reference numbers to denote the same structure. Additionally, some features are not re-introduced and/or labeled. The antenna 700 includes the reflector antenna heating system 704. In addition to the features illustrated and described with respect to FIG. 7, the reflector antenna heating system 704 includes a first cover panel 804 that covers the first heater blower device 724 and the first outlet duct assembly 726 and a second cover panel 808 that covers the second heater blower device 728 and the second outlet duct assembly 730. The first cover panel 804 insulates the first heater blower device 724 and the first outlet duct assembly 726 and extends between the radial ribs of the antenna 700. The second cover panel 808 insulates the second heater blower device 728 and the first outlet duct assembly 726 and also extends between the radial ribs of the antenna 700. Additionally, in some examples, a region covered by the first cover panel 804 and the second cover panel 808 can also include insulation to impede heat dissipation to the parabolic reflector 708.

The antenna pointer 800 is configured to change a pointing direction of the antenna 700. In some examples, the antenna pointer 800 enables the pointing direction of the 700 to change by about 180 degrees in a horizontal and vertical plane. More particularly, the antenna pointer 800 includes servo motors for tacking one or more target satellites such as a low earth orbit (LEO) satellite and/or a medium earth orbit (MEO) satellite.

Figure 9:
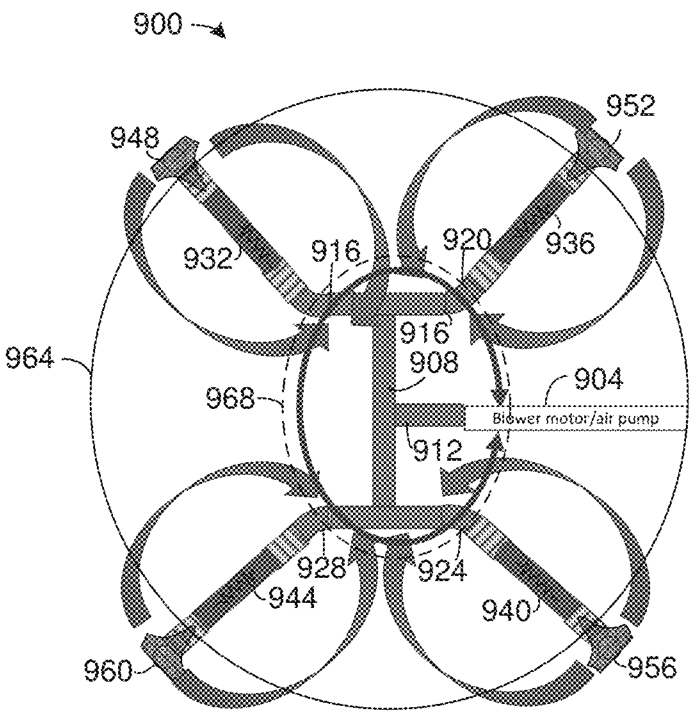
FIG. 9 illustrates a simplified example of an antenna heating system with a single fan and multiple heating elements.

FIG. 9 illustrates a simplified example of a reflector antenna heating system 900 with a single fan 904 (air pump) and multiple heating elements. As noted, the reflector antenna heating system 704 mounted on the antenna 700 of FIG. 7 includes a fan 734 for each of the first heater blower device 724 and the second heater blower device 728.

The fan 904 blows air into a splitter duct 908. The splitter duct 908 includes a single inlet 912 and four (4) outlets, namely, a first outlet 916, a second outlet 920, a third outlet 924 and a fourth outlet 928. The first outlet 916 is coupled to a first heating element 932, the second outlet 920 is coupled to a second heating element 936, the third outlet 924 is coupled to a third heating element 940, and the fourth outlet 928 is coupled to a fourth heating element 944. The first heating element 932 is coupled to a first nozzle 948, the second heating element 936 is coupled to a second nozzle 952, the third heating element 940 is coupled to a third nozzle 956 and the fourth heating element 944 is coupled to a fourth nozzle 960. The first nozzle 948, the second nozzle 952, the third nozzle 956 and the fourth nozzle 960 are each constituent components of respective outlet duct assemblies (details are omitted for clarity)

Heated air flows from the first nozzle 948, the second nozzle 952, the third nozzle 956 and the fourth nozzle 960 to a region underlying a radome 964 (e.g., a face radome) that is schematically represented as a circle. The heated air circulates and cools as the heated air reaches a center region 968, and this cooled air is re-circulated by the fan 904. By implementing the reflector antenna heating system 900, a single fan (namely the fan 904) is employable to provide air to multiple heaters to facilitate the circulation of heated air.

Figure 10:
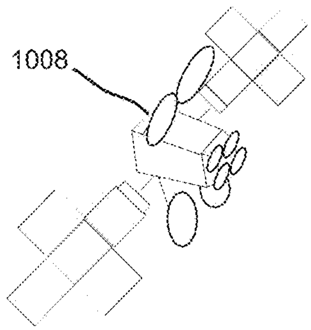
FIG. 10 illustrates an alternative example of an antenna with a reflector antenna heating system mounted thereon.
Figure 10:
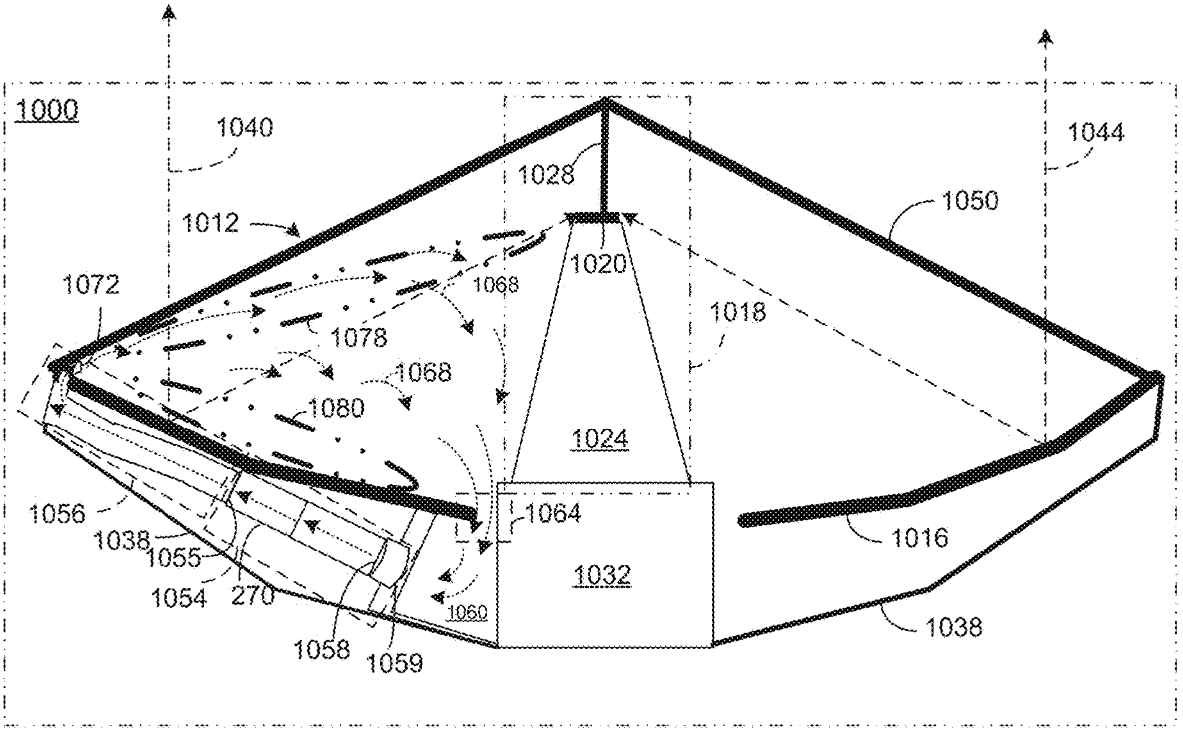

FIG. 10 is a diagram illustrating an alternative example of an antenna 1000 mounted at a gateway (e.g., a ground station) for communications with a target satellite 1008, wherein a reflector antenna heating system 1012 is mounted on the antenna 200. The antenna 1000 can be employed as an element of an antenna system, such as the antenna system 104 of FIG. 1. More specifically, the antenna 1000 can be employed to implement the antenna 150 of FIG. 1, and the reflector antenna heating system 1012 can be employed to implement the reflector antenna heating system 102 of FIG. 1. Similarly, the target satellite 1008 can be employed to implement the target satellite 116 of FIG. 1.

The antenna 1000 is implemented as a dish antenna with a parabolic reflector 1016. In some examples, the parabolic reflector 1016 is implemented with a paraboloid shape with a circular cross section. In other examples, the parabolic reflector 1016 is implemented with a paraboloid shape with an oval cross section. The antenna 1000 includes a feed subsystem 1018. The feed subsystem 1018 includes a feedhorn 1020 and a feed can 1024, and the feedhorn 1020 is mounted on the feed can 1024. The feed can 1024 is mounted on a reflector hub 1032 proximal to a center of the antenna 1000. The feed subsystem 1018 also includes a spar 1028 (or other support structure) that extends from a center region of the antenna 1000 to a region that extends beyond the feedhorn 1020. The feed can 1024 is mounted on a reflector hub 1032, which reflector hub 1032 can be mounted on an antenna pointing system that controls a pointing direction of the antenna 1000, such as the antenna pointer 800 of FIG. 8.

Radial ribs 1038 are arranged on an outer side (a non-reflecting side) of the parabolic reflector 1016. The radial ribs 1038 are arranged to provide structural support for the parabolic reflector 1016.

Communication signals are propagated in directions indicated by a first arrow 1040 and a second arrow 1044. As indicated by the first arrow 1040 and the second arrow 1044, uplink (outgoing) signals that are transmitted from the feedhorn 1020 are reflected by an inner side (e.g., a reflecting side) of the parabolic reflector 1016 toward the target satellite 1008. Additionally, downlink (incoming) signals are transmitted from the target satellite 1008, reflected by the inner side of the parabolic reflector 1016 and received by the feedhorn 1020. Additionally, although the antenna 1000 is shown to provide two-way communication signals with the target satellite 1008, in other examples, the antenna 1000 provides one-way communications with the target satellite 1008.

The signals communicated by the antenna 1000 range from about 3.7 GHz to about 14 GHz or higher. Moreover, the greater the frequency, the more susceptible the antenna 200 is to interference caused by environmental conditions, such as ice, snow and/or frost accumulating on portions of the antenna 1000. To curtail the impact of the environmental conditions, the reflector antenna heating system 1012 is installed on the antenna 1000. The reflector antenna heating system 1012 includes a radome 1050 (e.g., a face radome) formed of a dielectric (e.g., fabric) stretched over the parabolic reflector 1016 and the feed subsystem 1018, including a top of the spar 1028. In the example illustrated, the radome 1050 has a conical shape, but in other examples, other shapes, such as a frustum conical shape are employable. In some examples, the radome 1050 is stretched taut to avoid wrinkles on an exposed surface of the radome 1050.

The reflector antenna heating system 1012 also includes a heater blower device 1054, which is implemented with the heater blower device 254 of FIG. 2 in some examples. An outlet port 1055 of the heater blower device 1054 is coupled to a outlet duct assembly 1056, which can be employed to implement the outlet duct assembly 256 of FIG. 2. In the example illustrated, there is one heater blower device 1054 and one outlet duct assembly 1056, but in other examples, there is a set of heater blower devices 1054 and a set of outlet duct assemblies 1056 that are arranged circumferentially about the parabolic reflector 1016 (e.g., as illustrated in FIG. 7-8). The heater blower device 1054 includes a fan (e.g., an axial fan) that drives air from an inlet port 1058 coupled to an inlet duct 1059 situated in a planum 1060. The planum 1060 underlies a gap 1064 between the reflector hub 1032 and the parabolic reflector 1016. The gap 1064 is positioned to be spaced apart from a region of the parabolic reflector 1016 that reflects the communication signal propagating in the directions indicated by the first arrow 1040 and/or the second arrow 1044. The inlet duct 1059 is coupled to the inlet port 1058 of the heater blower device 1054. The inlet duct 1059 provides a passage for air to flow through the planum 1060 and to the heater blower device 1054.

Airflow in the antenna 1000 is characterized with arrows 1068, only some of which are labeled. The heater blower device 1054 blows heated air from the inlet port 1058 to the outlet duct assembly 1056, which directs heated air to an outlet port 1072. The outlet port 1072 is pointed in a direction extending tangential to a leg of the radome 1050, such that heated air flows proximal to an inside surface of the radome 1050. The heated air flows across the inside surface of the radome 1050 and toward the feed subsystem 1018 of the antenna 1000. More particularly, the heater blower device 1054 and the outlet duct assembly 1056 operate in concert to blow heated air such that heated air flows over a first region 1078 proximal to the underside of the radome 1050 at a greater velocity than heated air flowing over a second region 1080 proximal to a surface of the inner side of the parabolic reflector 1016. Stated differently, heated air flowing near the radome 1050 has a first velocity, and heated air flowing over the inner side of the parabolic reflector 1016 has a second velocity, and the first velocity is greater than the second velocity. Moreover, as the heated air cools, the cooled air is drawn into the planum 1060 by the heater blower device 1054 for re-heating and recirculation.

By implementing the reflector antenna heating system 1012 on the radome 1050, as an environmental temperature is lowered, ice, snow and/or frost is impeded from accumulating on an exterior surface of the radome 1050 because heated air is flowing proximally to the underside of the radome 1050, such as in the first region 1078. Contemporaneously, a relatively small amount of heated air flows over the inner surface of the parabolic reflector 1016. Accordingly, the parabolic reflector 1016 has a temperature that is closer to the environmental temperature than the radome 1050. Thus, misalignment due to thermal expansion of the parabolic reflector 1016 is curtailed. Moreover, because the feedhorn 1020 (which is heated by the heated air) is smaller than the parabolic reflector 1016, the thermal expansion of the feedhorn 1020 is also relatively small.

Further still, as illustrated, signals communicated between the target satellite 1008 and the feedhorn 1020 only traverse the radome 1050 once. Accordingly, attenuation of the signals communicated between the target satellite 1008 and the feedhorn 1020 is curtailed. In comparison to other antennas (e.g., the antenna 200 of FIG. 2 and/or the antenna 700 of FIGS. 7 and 8), the antenna 1000 omits a subreflector. Additionally, the antenna 1000 includes the spar 1028 (e.g., a rigid pole) to support the radome 1050. Moreover, in the example provided, the architecture of the antenna 1000 allows the radome 1050 to have a conical shape.

Figure 11:
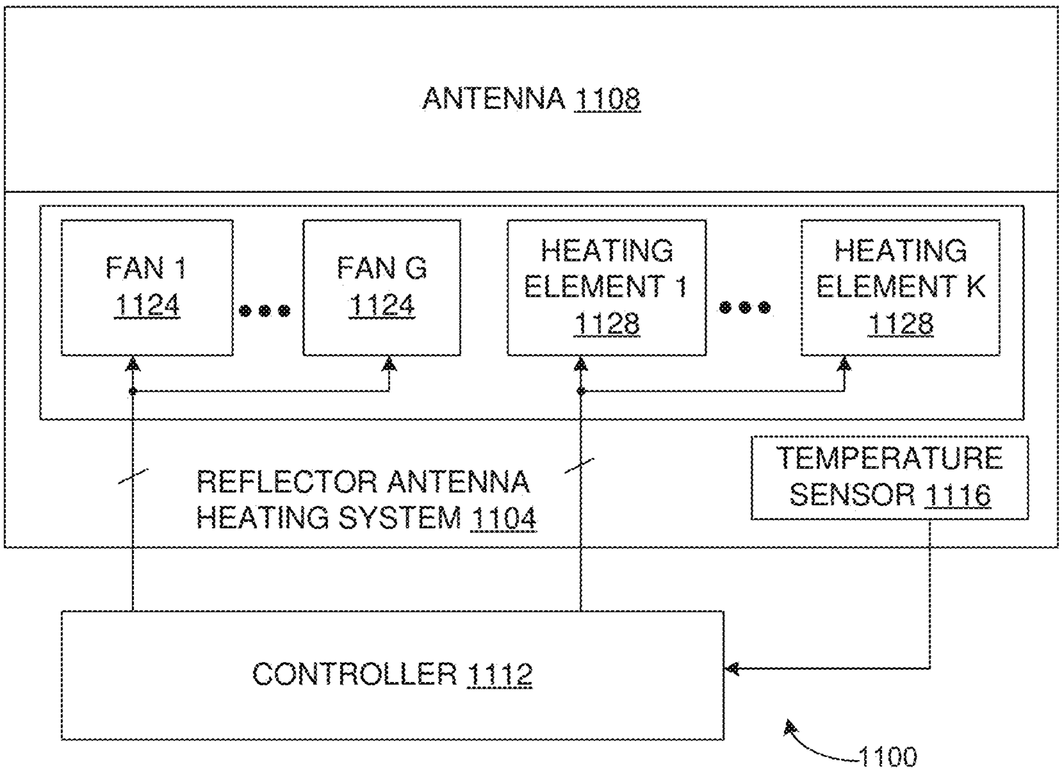
FIG. 11 illustrates an example of a control system for an antenna heating system mounted on an antenna.

FIG. 11 illustrates an example of a control system 1100 for a reflector antenna heating system 1104 mounted on an antenna 1108. The reflector antenna heating system 1104 can be implemented with the reflector antenna heating system 102 of FIG. 1, the reflector antenna heating system 212 of FIG. 2, the reflector antenna heating system 704 of FIGS. 7-8, the reflector antenna heating system 900 of FIG. 9 and/or the reflector antenna heating system 1012 of FIG. 10. Additionally, the antenna 1108 can be implemented with the antenna 150 of FIG. 1, the antenna 200 of FIG. 2, the antenna 700 of FIGS. 7 and 8 or the antenna 1000 of FIG. 10.

The control system 1100 includes a controller 1112 that provides instructions to the reflector antenna heating system 1104. In various examples, the controller 1112 is implemented as a microcontroller with onboard instructions. Alternatively, the controller 1112 is implemented as a computing platform, such as a non-transitory machine readable memory (e.g., volatile and/or nonvolatile memory) that stores machine executable instructions and a processing unit (e.g., one or more processor cores) that accesses the memory and executes the machine readable instructions.

The controller 1112 receives a signal from a temperature sensor 1116 of the reflector antenna heating system 1104. In some examples, the temperature sensor 1116 is mounted on an exterior of the 1108, such as on an outer side (non-reflecting side) of a parabolic reflector of the antenna 1108. In other examples, the temperature sensor 1116 is mounted separately from the antenna 1108. The temperature sensor 1116 provides a signal to the controller 1112 characterizing an environmental temperature.

The controller 1112 is configured to provide a control signal to one or more heater blower devices of the reflector antenna heating system 1104. More particularly, the controller 1112 is configured to provide a control signal to heater blower devices of the reflector antenna heating system 1104. More specifically, the controller 1112 is configured to provide a control signal to G number of fans 1124 of the heater blower devices, where G is an integer greater than or equal to one. The controller 1112 is also configured to provide control signals to K number of heating elements 1128, where K is an integer greater than or equal to one. The control signals can turn on and turn off the G number of fans 1124 and the K number of heating elements 1128.

In operation, the controller 1112 can be configured to monitor the signal from the temperature sensor 1116 and determine if the antenna 1108 is operating below a threshold temperature (e.g., about −5 to about 5 degrees Celsius). In response to determining that the antenna 1108 is operating below the threshold temperature, the control system 1100 provides control signals to the fans 1124 and the heating elements 1128 of the reflector antenna heating system 1104 to heat a radome of the 1108 in a manner described herein until the antenna 1108 reaches the threshold temperature.

Moreover, in other examples, in addition or in alterative to monitoring the signal from the temperature sensor 1116, the controller 1112 can receive an asserted heating signal from an external source (e.g., operating on a network) requesting that the controller activate the control system 1100. In response to the heating signal, the controller 1112 provides the control signals to the G number of fans 1124 and the K number of heating elements 1128 causing the G number of fans 1124 and the heating elements 1128 to turn on and heat the antenna 1108 in the manner described herein until the heating signal is de-asserted and/or until the antenna 1108 reaches the threshold temperature.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A reflector antenna heating system comprising: a dielectric radome that covers a first side of a reflector and an antenna; one or more heater blower devices on a second side of the reflector, each of the one or more heater blower devices having an inlet port and an outlet port; one or more outlet duct assemblies, wherein each outlet duct assembly is coupled to the outlet port of at least one of the one or more heater blower devices and configured to direct heated air from the coupled outlet port of at least one of the one or more heater blower devices on the second side of the reflector to the first side of the reflector such that the heated air flows between an inside surface of the dielectric radome and the first side of the reflector; and one or more gaps to recirculate cooled air toward respective inlet port of each heater blower device of the one or more heater blower devices.

2. The reflector antenna heating system of claim 1, wherein the dielectric radome further covers a feed subsystem of the antenna, the feed subsystem comprising a feedhorn and a subreflector.

3. The reflector antenna heating system of claim 2, wherein the feed subsystem of the antenna further comprises a spar and a feed can.

4. The reflector antenna heating system of claim 2, wherein signals communicated between a satellite and the feedhorn of the antenna pass through the dielectric radome only once.

5. The reflector antenna heating system of claim 1, further comprising insulating material circumscribing a portion of the one or more heater blower devices and the corresponding one or more outlet duct assemblies to impede heat transfer between the reflector of the antenna and the one or more heater blower devices and the corresponding one or more outlet duct assemblies.

6. The reflector antenna heating system of claim 1, wherein each heater blower device of the one or more heater blower devices comprises:

an axial fan configured to force air from the inlet port of a respective heater blower device; and a heating element downstream from the axial fan that heats air forced from the axial fan to provide the heated air to the outlet port of the respective heater blower device.

7. The reflector antenna heating system of claim 1, wherein each outlet duct assembly of the one or more outlet duct assemblies comprises:

a hose feed coupled to the outlet port of a respective heater blower device of the one or more heater blower devices to direct airflow in a first direction;

a circular to rectangular transition element coupled to the hose feed to spread air flowing in a first plane extending in the first direction;

an elbow element with a first port coupled to the circular to rectangular transition element and a second port that extends in a direction perpendicular to the first port to redirect airflow from the first direction to a second direction perpendicular to the first direction;

a spreader coupled to the second port of the elbow element to spread air flowing in a second plane extending in the second direction; and a nozzle coupled to the spreader to direct air in two directions within the second plane.

8. The reflector antenna heating system of claim 7, wherein the one or more outlet duct assemblies are arranged such that a nozzle of a first outlet duct assembly of the one or more outlet duct assemblies is situated directly across from a nozzle of a second outlet duct assembly of the one or more outlet duct assemblies.

9. The reflector antenna heating system of claim 1, further comprising one or more tension assemblies arranged at the perimeter of the reflector, wherein each tension assembly of the one or more tension assemblies applies radial tension on the dielectric radome.

10. The reflector antenna heating system of claim 9, wherein each of the one or more tension assemblies comprises:

a bracket with a first region that extends parallel to a plate at the perimeter of the reflector and a second region that is curved toward a center of the antenna;

a tab extending perpendicular to the first region of the bracket; and a spring loaded tension bolt extending through a hole in the dielectric radome and a hole in the tab.

11. The reflector antenna heating system of claim 1, further comprising one or more panel covers affixed to the second side of the reflector that each cover a respective heater blower device of the one or more heater blower devices and a respective outlet duct assembly of the one or more outlet duct assemblies.

12. The reflector antenna heating system of claim 2, wherein the one or more heater blower devices and the one or more outlet duct assemblies are arranged such that the feed subsystem of the antenna is heated to a greater temperature than the reflector of the antenna.

13. The reflector antenna heating system of claim 1, wherein the antenna is a parabolic antenna for communicating with one or more satellites.

14. The reflector antenna heating system of claim 1, wherein the reflector is a parabolic reflector comprising one or more radial ribs on the second side of the parabolic reflector, and each of the one or more outlet duct assemblies is situated between a respective pair of radial ribs of the one or more radial ribs.

15. The reflector antenna heating system of claim 14, wherein each respective pair of radial ribs and the perimeter of the parabolic reflector cooperate to define a volume and a respective heater blower device of the one or more heater blower devices and a respective outlet duct assembly of the one or more outlet duct assemblies are positioned within the volume.

16. The reflector antenna heating system of claim 1, wherein each of the one or more outlet duct assemblies is situated to direct heated air tangentially to the inside surface of the dielectric radome and toward a center of the reflector.

17. The reflector antenna heating system of claim 2, wherein the dielectric radome has a frustum conical shape or a conical shape, and a center region of the dielectric radome overlies the feed subsystem.

18. The reflector antenna heating system of claim 1, wherein the dielectric radome is formed of a flexible fabric.

* * * * *